United States Patent [19]

Nagy

[11] 4,361,835
[45] Nov. 30, 1982

[54] HALL-CELL LIQUID LEVEL DETECTOR

[75] Inventor: Bela G. Nagy, Acton, Mass.

[73] Assignee: Sprague Electric Company, North Adams, Mass.

[21] Appl. No.: 244,357

[22] Filed: Mar. 16, 1981

[51] Int. Cl.³ .............................................. G01F 23/12
[52] U.S. Cl. ...................................... 340/624; 73/313; 338/32 H; 340/618
[58] Field of Search ...................... 340/618, 623, 624; 73/308, 313, 314; 310/DIG. 3; 338/32 H

[56] References Cited

U.S. PATENT DOCUMENTS

| | | | |
|---|---|---|---|
| 3,484,774 | 12/1969 | Borgnakke | 340/624 |
| 3,646,293 | 2/1972 | Howard | 73/313 |
| 3,935,741 | 2/1976 | Zinsmeyer et al. | 73/313 |
| 4,084,436 | 4/1978 | Smitherman | 73/313 |
| 4,124,814 | 11/1978 | Lauerman | 338/32 H |
| 4,284,904 | 8/1981 | Tetro | 340/624 |

FOREIGN PATENT DOCUMENTS 2627865 1/1978 Fed. Rep. of Germany ........ 73/308

OTHER PUBLICATIONS

Gems TLI and How it Works, a publication of Transamerica Delaval, Inc., Gems Sensors Division, Farmington, Connecticut, Copyright 1979, pp. 4, 5 and 6.

Primary Examiner—Gerald L. Brigance

[57] ABSTRACT

A liquid level detector "stick" includes a column of Hall-cells adapted to be mounted vertically in a liquid's containing tank. One or more toroidal magnets are slidably fitted about the stick. A float elevates the topmost magnet to the level of liquids in the tank. If the liquids comprise two immiscible parts, a second of the magnets may be floated at the surface of the denser liquid part. A very low power electronic system continuously scans the Hall-cells and determines which particular one or ones of them are adjacent a magnet. This detector may be used in a gasoline station storage tank that may also contain water, providing accurate measure of both liquids. It is also capable of operating in a monitor mode for sounding an alarm when a change in the level of either liquid part occurs that may indicate leakage into or from the tank or an attempted theft.

7 Claims, 18 Drawing Figures

Fig. 1.

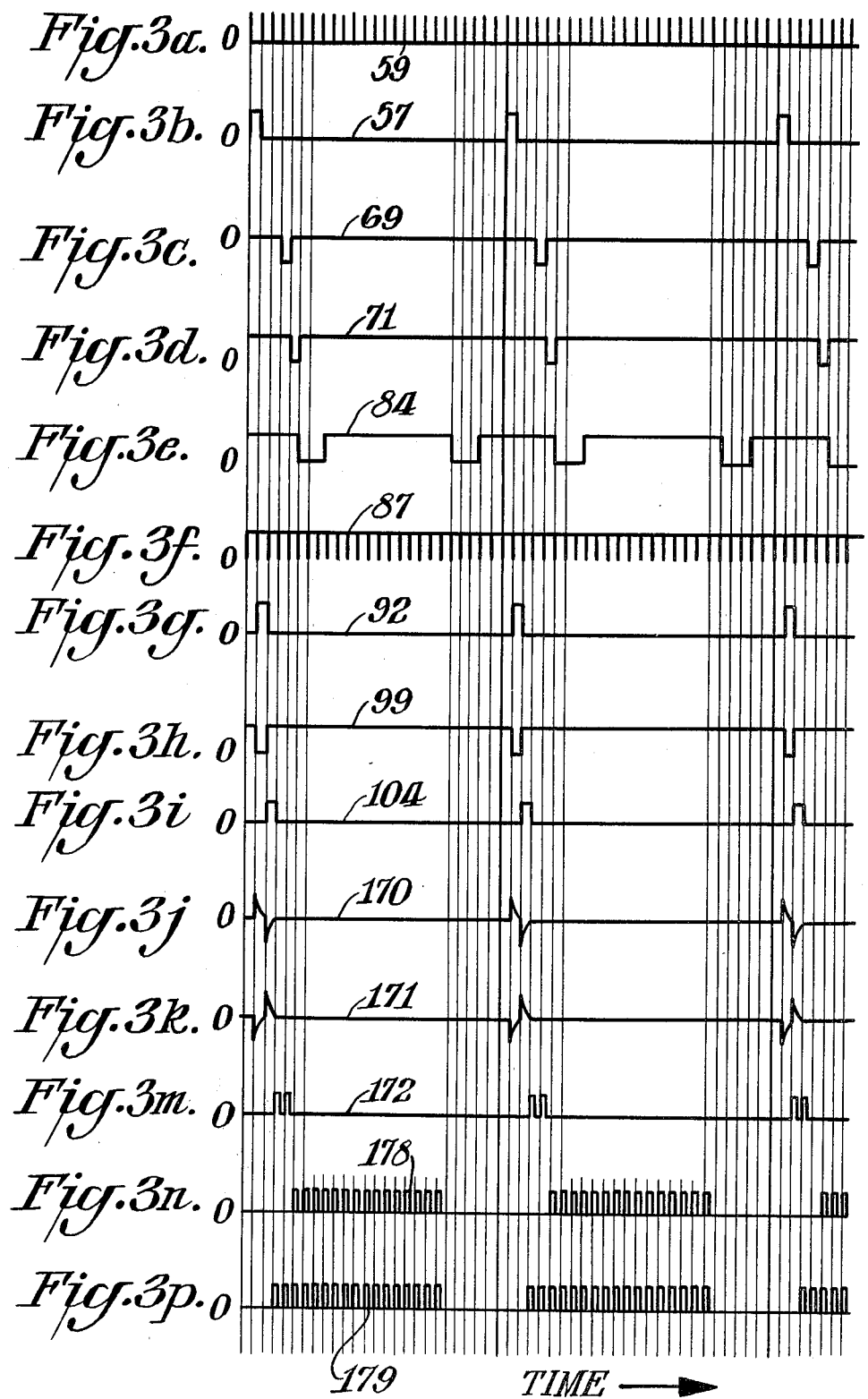

HALL-CELL LIQUID LEVEL DETECTOR

BACKGROUND OF THE INVENTION

This invention relates to liquid level gauges and more particularly to gasoline storage tank gauges capable of accurately and continuously monitoring and/or displaying the amount of gasoline and underlying water contained in a gasoline service station tank.

The capacity of such tanks is typically 8000 gallons. The tank length and height are 21 feet and 8 feet, respectively. At about half full, a change in level of 1 inch represents about 100 gallons.

The most accurate method now used for determining the level of a large volume of liquid is the wooden dipstick that is marked off in inches or other length units. It is inserted to the bottom of the tank and withdrawn. The position of the "wet line" is then noted. Due to evaporation and wicking, the resolution of this measurement is limited to about $\frac{1}{4}$ inch.

A widely used gauge for measuring liquid level is comprised of two uniformly spaced electrodes that extend from the top to nearly the bottom of the tank. The dielectric constant of gasoline being greater than that of air, the electrical capacitance between the two electrodes is taken as a measure of the level. This method is not as accurate as the aforementioned dipstick method, being subject to errors due to the variability in gasoline vapor content of the air in the upper portion of the tank that changes the dielectric constant in this upper portion in an unpredictable way. It also raises problems of safety since it requires electrifying the electrodes that are exposed directly to the gasoline and the overlying highly flammable vapors.

Another liquid level gauge is comprised of a string of series connected magnetic field actuated reed-relays. A resistor is connected across each relay. The relay string and resistors are mounted in a protective tube which is mounted vertically in the tank. A magnet is mounted to an annular float that is adapted to be slidably movable about the tube in a vertical direction. The total resistance of the string is taken as a measure of the liquid level. This total resistance is inversely proportional to the number of reed relays whose contacts are closed. Like the above mentioned capacitor gauge, the reed relay gauge provides an analog measure of the liquid level.

It is particularly important for the operator of a gasoline service station that he be able to accurately detect changes in the level of his tanks. Losses through leakage, theft, or faulty accounting at filling are not likely to be detected by such gauges. These gauges have the disadvantage that they are especially insensitive to small level changes when the tank is from about half full to full of liquid.

It is an object of the present invention to overcome the above noted shortcomings of the prior art gauges.

It is a further object of this invention to provide a gasoline level gauge having the same resolution at the full condition as as the near empty condition.

It is a further object of the invention to provide such a gauge that is capable of continuous operation from a battery drawing a very small current so as to be capable of sounding an alarm in case of leakage or theft.

It is yet another object of this invention to provide such a gauge that may monitor the levels of two or more immiscible liquids of different densities in the same tank.

SUMMARY OF THE INVENTION

A liquid level detector is comprised of a column of Hall-cells adapted to be mounted vertically in a liquid containing tank. A magnet is adapted to be held movable in a vertical direction adjacent to the vertical column of Hall-cells. A means is provided for keeping the magnet at the level of the liquid. An electronic means produces an electrical signal that identifies the particular one of the Hall-cells that is at the magnet and the liquid level. This is effective to provide a highly accurate indication of the height of the liquid level.

Variations in temperature do not affect the result, except for the small density changes that can be easily accounted for. Resolution of the measurement is directly related to the number of Hall-cells per unit distance along the vertical column, which resolution is only limited by the Hall-cell package dimensions. Thus the accuracy and resolution given in terms of unit height remains fixed and independent of liquid level. Combined with these features is the capability for operating in a continuous monitor mode for sounding an alarm when there is a change in the level indicating theft or leakage of the liquid. An overfill alarm system is now also clearly feasible.

In the preferred liquid level detector of this invention, a ring connected shift register contains one bit that is continuously clocked about the ring. Also with each Hall-cell is associated a Schmitt trigger circuit that when energized by a DC source produces a signal when the magnetic field at the corresponding Hall-cell exceeds a predetermined value. The output of each shift register stage drives a gate that when the circulating one bit is in the corresponding shift register stage connects the corresponding Hall-cell and/or Schmitt trigger circuit to a DC electrical energy source. When both are so energized and the magnetic field exceeds the above noted predetermined value, a pulse is generated at the signal terminal to which all the Schmitt circuit outputs are connected. The time of occurrence of such a signal pulse, relative to the time at which the circulating bit is in a particular predetermined one (e.g. bottom most) of the shift register stages, serves a unique signal for identifying which of the Hall-cells is at the liquid level.

The technique of powering up only one Schmitt circuit and corresponding Hall-cell, exemplified by the shift register controlled gating system described above, makes it possible to operate a liquid level detector drawing a minuscule amount of electrical energy. This energy saving feature is especially valuable when the detector will serve in a theft or leakage alarm that will continuously operate from a battery so as not to be subject to power failures.

BRIEF DESCRIPTION OF THE DRAWINGS

FIG. 1 shows a diagram of a liquid level detector of this invention.

FIGS. 3a through 3p show voltage waveforms at various points in the diagram of FIG. 1.

DESCRIPTION OF THE PREFERRED EMBODIMENTS

Figure 1:
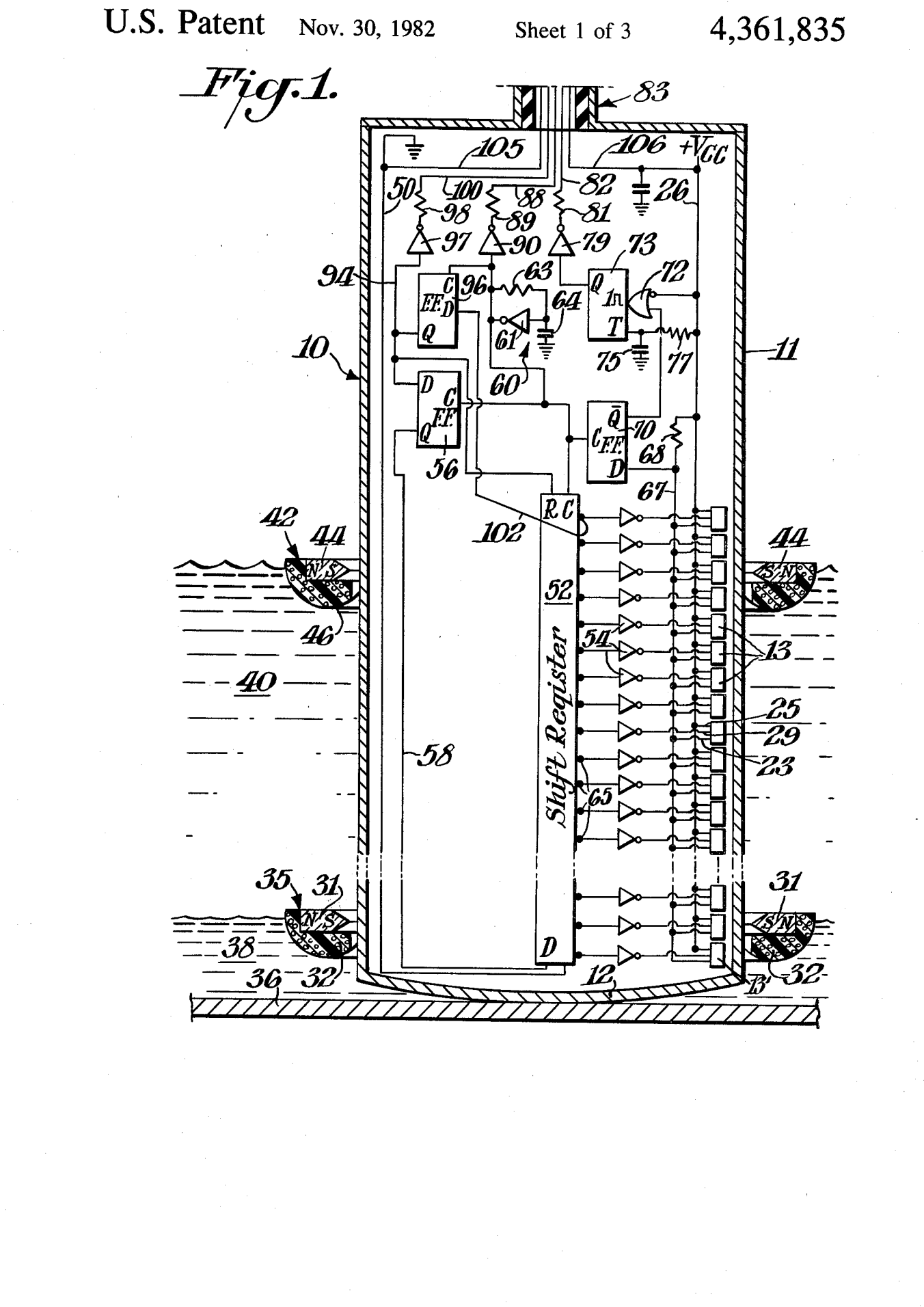
Figure 2:
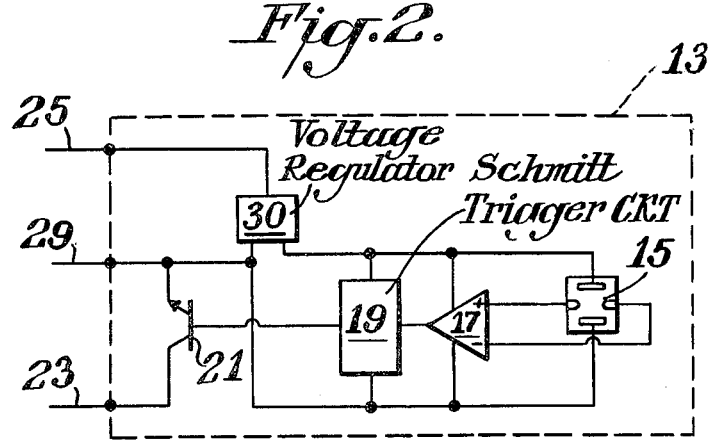
FIG. 2 shows a diagram of a Hall-cell sensor 13 of which many are included in the detector of FIG. 1.

The liquid level detector 10 of FIG. 1 has a protective copper tube 11 that has a closed bottom end 12. Inside the tube 11 is mounted a column of Hall-sensors 13. As illustrated in FIG. 2, each of the sensors 13 is an integrated circuit including a Hall-cell 15, a Hall-cell amplifier 17 and a Schmitt trigger circuit 19. Such an integrated circuit 13 is described by R. Genesi in U.S. Pat. No. 3,816,766 issued June 11, 1974 that is assigned to the same assignee as is the present invention. Thus when the magnetic field ambient to a Hall-cell 15 exceeds a predetermined strength, transistor 21 turns on. The Hall-sensor output voltage, appearing across the bottom lead wire 23 and middle lead wire 25, will then drop to zero from a value $+Vcc$ (appearing at buss 26). Power is supplied to a Hall-sensor 13 by connecting a d.c. power supply (of $+Vcc$ volts) between sensor lead wires 29 and 25 which energizes the on-board voltage regulator 30.

A toroidal magnet 31 being radially magnetized is mounted in a toroidal float 32. This toroidal assembly 35 is fitted loosely about the copper tube 11 and is designed to float in the water 38 but to sink in the gasoline 40. Both liquids are contained by tank 36. The density of gasoline is about 30% less than that of water and so this magnet-float assembly 35 is not critical in design. Another toroidal magnet-float assembly 42 is similarly constructed and includes a magnet 44 and float 46. This assembly 42 is designed to float in gasoline.

The electronics in the detector 10 of FIG. 1 is designed to sequentially connect the supply voltage that appears across Vcc buss 26 and ground buss 50 to each Hall-sensor 13 in turn. This is accomplished by permanently connecting the leads 25 of all sensors 13 to buss 26 ($+Vcc$) and sequentially electronically connecting to buss 50 the ground lead wire 29 of first the bottom-most sensor 13', then to the next highest sensor 13 and so on up the column. After reaching the top, the bottom-most sensor 13' is again excited. The ring connected shift register 52 makes each of those sequential sensor ground connections through a Darlington switch 54.

One "bit" is introduced from flip flop 56 as a pulse 57 of waveform 3b via wire 58 into the bottom-most stage of shift register 52. Clock pulses 59 as shown in FIG. 3a are generated by clock 60 that is comprised of amplifier 61 and the frequency determining components, resistor 63 and capacitor 64. The clock pulses 59, at about 10 KHz, step the one "bit" upward from stage to stage of the shift register 52 producing at successive shift register output terminals 65 a positive pulse that drives the corresponding Darlington switch 54 and grounds the corresponding Hall sensor 13. Thus only one sensor 13 is activated at a time. An activated sensor 13 to which a magnet 31 or 44 is adjacent will produce an output signal. More particularly, transistor 21 of sensor 13 turns on presenting a short across leads 23 and 29.

The output leads 23 of Hall sensors 13 are all permanently connected to a common signal wire 67 that is connected via resistor 68 to buss 26 at $+Vcc$. By counting the clock pulses, from the time the bit is introduced in the bottom-most shift register stage to the time that a signal, as in waveform 69 in FIG. 3c, appears on the common signal wire 67, the particular Hall-cell sensor 13 to which floating magnet 31 is adjacent may be identified. In this system the clocked flipflop 70 is set by the signal from wire 67 to produce a pulse, as in waveform 71 of FIG. 3d, at one input of the exclusive OR gate 72 that will in turn cause the monostable multivibrator 73 to produce a pulse of about 300 microseconds width, as determined by values of capacitor 75 and resistor 77. This pulse is amplified, and inverted in amplifier 79, and through resistor 81 the pulse is sent out by wire 82 in cable 83 having a waveform 84 as in FIG. 3e.

When the one "bit" subsequently ripples up to activate the Hall-sensor 13 that is adjacent the magnet 44, a next output pulse (waveform 84) appears on cable wire 82 as in FIG. 3e. The clock pulses 87 in FIG. 3f that are transmitted via cable wire 88 through resistor 89 have been inverted by amplifier 90. Pulses 92 of FIG. 3g on the conductor 94 from the (Q) output of flipflop 96 are delayed by one cycle of the clock 60 and are inverted in amplifier 97 and sent via resistor 98 as pulses 99 in FIG. 3h to cable wire 100.

The ring connection of the shift register 52 from the last (top) stage to the first (bottom) stage is effected through conductor 102, clocked flipflops 96 and 56, and conductor 58. A reset pulse 92, FIG. 3g from the Q output of flipflop 96 occurs just prior to setting the one bit, pulse waveform 104 of FIG. 3i, in the first stage (terminal D) of the shift register 52.

Alternatively, the system may be simplified by causing the resetting of the register 52 at the time that the second signal, corresponding to the position of the second magnet 44, appears on conductor 67. However, the fixed ring in the preferred embodiment of FIG. 1 provides a fail safe feature that avoids the possibility that a Hall-sensor 13 that is adjacent a magnet 31 or 44 fails to produce a signal, that in the variable ring system may cause the logic of the system to cease functioning normally.

The information appearing at the three cable wires 82, 88 and 100 (corresponding to pulse waveforms 84, 87 and 99, respectively) taken together comprises an electrical signal that uniquely identifies the particular ones of the Hall-cells that are at the water level and gasoline level, respectively. In addition to these output signal wires 82, 88 and 100, the cable 83 contains wires 105 and 106 providing the ground and $+Vcc$ connections to an external DC power supply.

A working prototype of the liquid level detector illustrated in FIG. 1 was constructed. The copper tube 11 has an inside diameter of 1¼ inches (3.18 cm). A printed wire board strip of nearly that width has mounted along one edge thereof 288 Hall-cell sensors 13. These Hall-cell sensors are spaced 0.125 inches center to center, and as will be appreciated this spacing corresponds to the resolution of the liquid level detection system.

The 288 stage shift register 52 was comprised of 72 integrated quad flipflops type CD 4015 B made by RCA, Sommerville, N.J. The 288 Darlington Switches 54 were made up of 36 Darlington transistor arrays type ULS2804 made by Sprague Electric Company, Worcester, Mass. Each of the 288 Hall-cell sensors 13 consists of a UGN3019T made by Sprague Electric Company. The type D flipflops, 56, 70 and 96 are each half of a CD4013 dual MOS flipflop made by RCA. The OR gate 72 and one shot multivibrator 73 are combined in type MC14528 made by Motorola, Phoenix, Ariz. The four inverting isolation amplifiers 61, 79, 90 and 97 are included in an integrated circuit type CD40106 made by RCA. Power supply and ground reference wiring from +Vcc buss 26 and ground buss 50 to the flipflops 52, 56, 70 and 96 as well as to the one shot 73 are omitted for clarity. Operating with a +Vcc voltage of 10 volts, the logic and drive circuitry of this liquid level detector 10 draws only about 200 microamperes or 2 milliwatts. This small current is a consequence of using MOS flipflops. The other operating current drawn by the detector 10 is attributable to the supply current being drawn by the single Hall-cell sensor 13 that is at any one moment connected across the DC supply busses 26 and 50. The particular Sprague sensor 13 identified above draws about 6 milliamperes at Vcc=10 volts, or 60 milliwatts. However many Hall-cell sensors are employed in a liquid level detector of this invention, the amount of power required to operate it remains the same.

An alternative approach to sequentially applying power to the Hall-cell sensors 13 comprises permanently tying all leads 29 to ground buss 50, using a pull-up or "source" gate in place of the sink gates 54 whereby leads 25 of sensors 13 are sequentially connected to buss 26. This may offer an advantage that the current flowing through a transistor 21 will no longer include a leakage current of all the other transistors 21. Alternatively the present circuit shown in FIG. 1 may be improved in this respect by adding a diode in series with the collector of each transistor 21 or groups of transistors 21.

Figure 4:
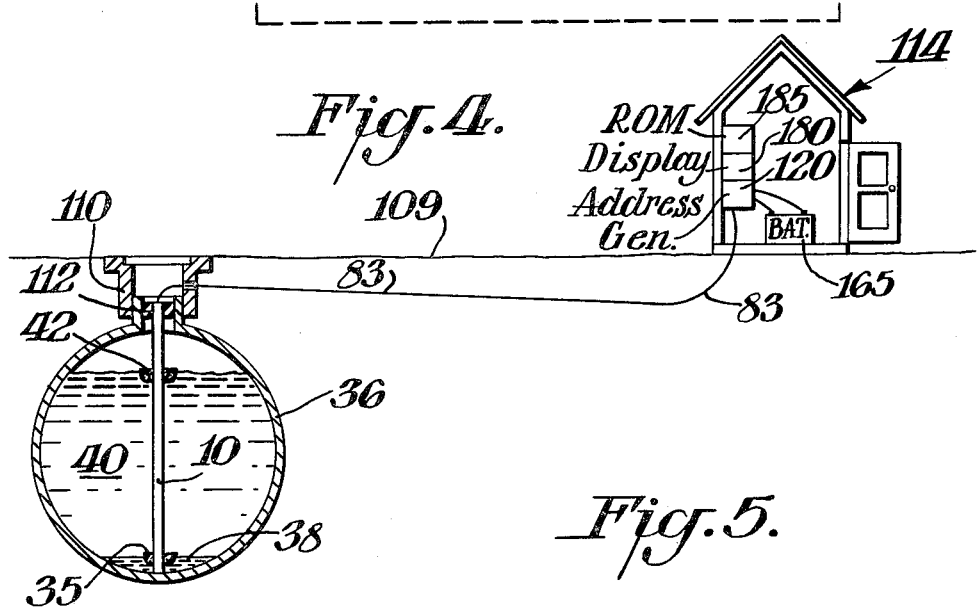
FIG. 4 shows a sectional view of a gasoline service station kiosk and an underground gasoline tank including the level sensor of FIG. 1.

With reference to FIG. 4, the dual liquid level detector 10 is shown mounted in a gasoline tank 36. The tank 36 contains water 38 and gasoline 40. Magnet-float assembly 35 assumes a position at the interface of the water 36 and gasoline 40, while the magnet-float assembly 42 is at the level of the gasoline. Knowing the shape and size of the tank 36 as well as the height from the bottom of the tank to one of the liquid levels, the total gallons under that level is readily determined.

The tank 36 is shown buried under the surface 109 of the ground with a small manhole 110 constructed above the tank port 112 to which the level detector 10 is fastened. Cable 83 is laid underground extending to inside a gasoline station kiosk 114. Here the cable 83 is connected to a so-called address generator 120 that is in-turn connected to a display by which the station operator may read the liquid levels. The number of gallons of water and of gasoline that are in his tank 36 may be displayed by connecting between the address generator 120 and the display 180, a read-only memory (ROM) 185 that stores a table of factors by which liquid level data is converted to number of gallons. These stored factors correspond to the geometry of the particular tank 36 that is used.

Figure 5:
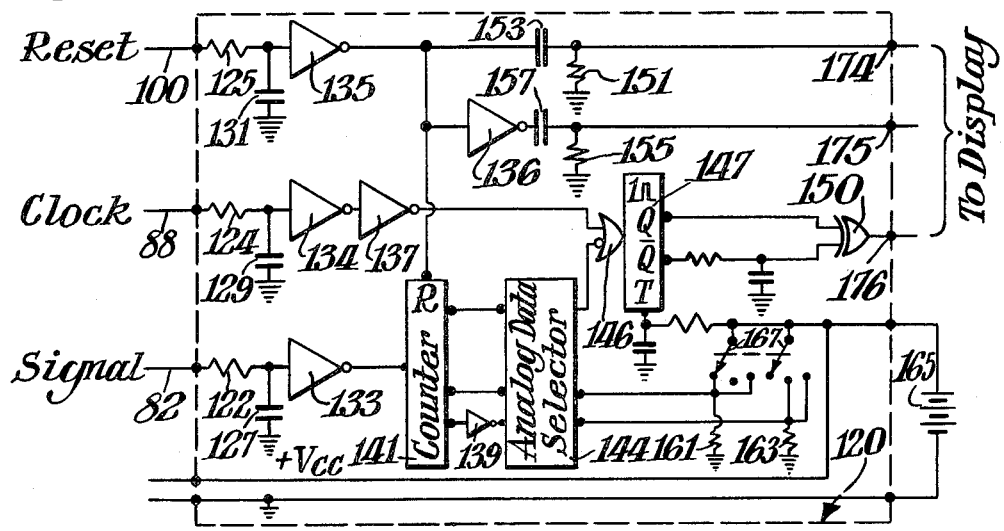
FIG. 5 shows a diagram of the address generator of FIG. 2.

With reference to the address generator 120 of FIG. 5, the resistors 122, 124 and 125 and the capacitors 127, 129 and 131 serve as noise filters at the signal lines 82, 88 and 100, respectively. The buffer inverter amplifiers 133, 134, 135, 136, 137 and 139 are from two integrated circuits, type CD40103 made by RCA. The counter 141 is a type CD4017 made by RCA. The data selector 144 is a type MC14529 made by Motorola. The OR gate 146 and one shot multivibrator 147 are in integrated circuit type 4528 made by Fairchild Camera and Instrument Corp., Mountain View, Calif. The exclusive OR 150 is a type MM74C86N from National Semiconductor.

The combination of resistor 151 and capacitor 153 and the combination of resistor 155 and capacitor 157 serve as differentiating networks. Resistors 161 and 163 hold at ground potential the gate control terminals of the data selector except when those terminals are connected to the positive terminal of the battery 165 by the double pole triple throw switch 167. Waveforms 170, 171 and 172 at output terminals 174, 175 and 176, respectively, are shown in FIGS. 3j, 3k and 3m, respectively. The waveform 172 at terminal 176 is for the switch 167 in the position shown. When switch 167 is rotated counter-clockwise to the next two positions, the waveforms 178 and 179 of FIGS. 3n and 3p, respectively, represent the signal at terminal 176. The number of pulses (two) in waveform 176 corresponds with the second Hall-cell being adjacent magnet 31 and indicate the level of water 38. The number of pulses in waveform 178 corresponds similarly to the distance between magnets 31 and 44 or the difference in levels of water and gasoline thus being a measure of the amount of gasoline. The waveforms in FIGS. 3a through 3p correspond to a liquid level detector having twenty-five (rather than 288) Hall-cells so that these waveforms are made clearer. The waveform 179 corresponds to the total amount of liquid in the tank 36. These signals are sent to a data display 180 that may count the pulses in waveform at terminal 176 of the address generator 120, and display that number via an illuminated numeral display system. A suitable display counter is type 74C927 made by National Semiconductor. A suitable numeric light emitting diode display is type MAN73 made by Monsanto, St. Louis, Mo.

It is preferred to use a starting circuit that insures the setting of one bit into shift register 52 via the output (wire 58) of flipflop 56 every time the power is turned on. This is easily accomplished by connecting the Q terminal of flipflop 96 through a resistor and a pull-up diode to the Vcc buss (26), connecting the resulting resistor-diode junction to the set (s) terminal of flipflop 96 and connecting a capacitor from that set (s) terminal to the ground buss (50). This start circuit is not absolutely essential and has been omitted in FIG. 1 for greater clarity of the principle portion of the system.

What is claimed is:

1. A liquid level detector comprising: a column of Hall-cells adapted to be mounted vertically in a tank containing a liquid; a magnet being adapted to move vertically at a substantially fixed spacing from said column of Hall-cells; a float means for maintaining said magnet at the surface of said liquid to increase the magnetic field at the Hall-cell adjacent to said magnet, and an electronic means for sequentially applying DC power to each of said Hall-cells in said column, and for sensing, shaping and summing the outputs of all said Hall-cells, whereby the time period, between said applying DC power to a particular predetermined one of said Hall-cells and the occurrence in said summed outputs of a Hall-cell output signal that is characteristic of a Hall-cell in the field of said adjacent magnet, provides a unique indication of said liquid level.

2. The liquid level detector of claim 1 wherein said predetermined Hall-cell is the bottom most one in said column and said sequentially applying DC power is effected up to at least said magnet-adjacent Hall-cell and then repetitively so sequentially applying said DC power.

3. The detector of claim 2 wherein said shaping and summing is effected by a plurality of Schmitt trigger circuits, the input of each Schmitt circuit being connected to the output of one of said Hall-cells and the outputs of all said Schmitt circuits being connected to a common signal output terminal.

4. The detector of claim 3 wherein said electronic means is additionally for sequentially applying DC power to each of said Schmitt trigger circuits synchronously with said applying DC power to the corresponding of said Hall-cells.

5. A liquid level detector comprised of a column of Hall-cells adapted to be mounted vertically in a liquid containing tank, a magnet being adapted to move in a vertical direction adjacent to said vertical column of Hall-cells, a float means for maintaining said magnet at the level of said liquid so that the output of said each Hall-cell produces a certain electrical response only when said magnet is adjacent the corresponding of said Hall-cells; a summing means, the outputs of said Hall-cells being electronically connected by said summing means to a signal output terminal, said summing means being for producing a particular signal at said signal output terminal at the time that any one of said Hall-cells produces said certain electrical response; a ring connected shift register, an output from each stage of said shift register having a connection to a separate one of said Hall-cells; and an electronic means for clocking said shift register, for continuously circulating one bit through said shift register and for sequentially applying electrical power via said connections to said Hall-cells so that with respect to the time that said circulating bit resides in a predetermined one of said shift register stages, the time of the occurence of said signal at said signal output terminal, is a unique indication of the height in said tank of said liquid level.

6. A liquid level detector comprising:
a column of Hall-cells adapted to be mounted vertically in a tank containing liquids; a plurality of magnets each being adapted to move vertically at a substantially fixed spacing from said column of Hall-cells; a float means for maintaining a first of said magnets at the surface of a first of said liquids, for maintaining a second of said magnets at the surface of a second and less dense than said first of said liquids to increase the magnetic field at the Hall-cells adjacent to said first and second magnets, respectively, and an electronic means for sequentially applying DC power to each of said Hall-cells in said column, and for sensing, shaping and summing the outputs of all said Hall-cells, whereby the time periods, between said applying DC power to a particular predetermined one of said Hall-cells and the occurence in said summed outputs of a Hall-cell output signal that is characteristic of a Hall-cell in the field of said adjacent magnet, provides unique indications of said liquid levels.

7. The liquid level detector of claim 1 wherein said electronic means is comprised of a means for one at a time sequentially applying DC power to said Hall-cells from the bottom of said column up to at least the Hall-cell adjacent the topmost of said magnets, and then repetitively so sequentially applying said DC power.

* * * * *

UNITED STATES PATENT AND TRADEMARK OFFICE
CERTIFICATE OF CORRECTION

PATENT NO. : 4,361,835
DATED : November 30, 1982
INVENTOR(S) : Bela G. Nagy

It is certified that error appears in the above—identified patent and that said Letters Patent is hereby corrected as shown below:

Claim 7, line 1 (Column 8, line 24) "claim 1"
should read -- claim 6 --

Signed and Sealed this

Fifteenth Day of February 1983

[SEAL]

Attest:

Attesting Officer

GERALD J. MOSSINGHOFF
Commissioner of Patents and Trademarks